Patented Jan. 8, 1952

2,581,639

UNITED STATES PATENT OFFICE 2,581,639

GLASS TO METAL SEAL AND GLASS COMPOSITION

James Earle Duncan, Brackenridge, and John J. Smith, Tarentum, Pa., assignors to Pittsburgh Plate Glass Company No Drawing. Application December 1, 1950, Serial No. 198,507

3 Claims. (Cl. 49—92.5)

This invention relates to a specific neutral gray glass and more particularly to such a glass composition adapted for production of sheet glass in conventional glass drawing machines and capable of sealing directly to a particular chrome-iron alloy.

In manufacture of special glasses requiring close control of the batch formula ingredients or ultimate analytical composition, the usual procedure is to form the melt in pots. This necessarily limits production because the process is not continuous and the quantities which can be handled in each melt are small. Ordinarily, however, demand for special glasses is limited and this compensates for the limitations on production methods.

An objective of the invention is the provision of a special glass of closely controlled quality and physical properties yet particularly adapted for continuous production in large quantities with conventional sheet glass melting and drawing machinery.

The large scale manufacture of television and other cathode ray tubes fabricated with metal shells comprising part of the tube envelope and face plates of glass has created a demand for low cost sheet glass of special physical properties not all of which are common to ordinary lime-soda glasses such as those produced in sheet or window glass production.

As the art of television tube manufacture has progressed, manufacturers have consistently sought to reduce the cost of tube components while at the same time to increase the quality of performance.

Where it is necessary to create a direct seal between metal and glass, it is essential that the linear coefficients of thermal expansion of the two materials should be nearly the same over a rather wide range of temperatures. Otherwise, the joint or seal cannot withstand the extreme variations in temperature to which it is subjected in manufacture and use. When the glass-metal seal constitutes an element in a structure in which glass is enclosed by the metal, it is frequently desired that the linear coefficient of thermal expansion of the glass should be slightly less than that of the metal. Thus, after melting or softening of the glass, the seal is formed during cooling. Due to the slight differential in coefficients, the glass and seal is placed under compression. If not too exaggerated, this produces a good permanent vacuum-tight seal, particularly in metal-shelled tubes.

At the outset of the production of television tubes comprising metal shells, the tube faces were made of clear glass especially adjusted in composition to afford the proper linear coefficient of expansion for direct sealing to metal shells. The alloys used for fabrication of shells were carefully selected with regard to their necessary physical properties and were relatively expensive. Later, a demand was created for a face plate of neutral color having the property of relatively uniform absorption of light in the portion of the spectrum lying between 440 and 660 millimicrons. A face plate with such absorption properties enhances definition and contrast and otherwise improves viewing of the image produced on the screen as well recognized in the television art.

A desideratum in the art of manufacturing television tubes is the provision of low-cost sheet glass having closely controlled physical and optical properties so as to afford a medium having the requisite color and light absorptive properties, and in addition a linear coefficient of thermal expansion nearly the same as, or preferably slightly less than, that of alloys lower in cost than those heretofore usable. One such alloy which is readily available, relatively inexpensive and otherwise suitable for tube envelope manufacture is known in the trade as "430 alloy" and consists of 17 per cent by weight chromium and 83 per cent by weight iron.

The present invention is directed to the provision of a novel glass which can be directly sealed to 430 alloy, can be manufactured continuously with conventional window glass machinery and combines with these attributes the requisite optical, color and light absorptive qualities to render it useful for fabrication into television tubes.

According to our invention, such glass may be prepared in a conventional process of drawing sheet glass by charging into the melting tank a glass batch of the following formula:

| Component: | Parts by weight |
|---|---|
| Sand | 1000 |
| Soda ash | 407.1 |
| Limestone | 86.3 |
| Dolomite | 198.9 |
| Aplite | 197.7 |
| Salt cake | 50.0 |
| Arsenic oxide ($As_2O_3$) | 3.0 |
| Rouge ($Fe_2O_3$) | 0.1 |
| Carbon | 1.0 |
| Cobalt oxide | 0.04 |
| Nickel oxide | 0.30 |

After conventional melting, refining and drawing, the sheet glass produced has the following ultimate analytical composition:

| Component: | Parts by weight |
|---|---|
| $SiO_2$ | 69.23 |
| $Na_2O$ | 16.68 |
| $CaO$ | 7.44 |
| $MgO$ | 2.67 |
| $Al_2O_3$ | 3.04 |
| $NaCl$ | .14 |
| $Na_2SO_4$ | .63 |
| $As_2O_5$ | .05 |
| $Fe_2O_3$ | .10 |
| $CoO$ | .003 |
| $NiO$ | .018 |

It will be recognized that glass sand ordinarily contains iron and when absent, the slight deficiency in this component of the batch should be corrected to reach the ultimate analysis given. Other variations in the raw materials or varying conditions in the melting and refining of the batch may reflect in variations between the foregoing batch formula and the ultimate analysis given, but the correction in the batch required to achieve the ultimate analysis is apparent to those skilled in the art.

The sheet glass described, when drawn to a thickness between .210 and .225 inch, has the following typical properties:

Refractive index $N_d$ ___ 1.518
Specific gravity (grams/cm.³) ___ 2.523
Thermal expansion (lineal) ___ $\begin{cases} 9.56 \times 10^{-6} \text{ per } °C. (25 \text{ to } 300.°C.) \\ 10.49 \times 10^{-6} \text{ per } °C. (25 \text{ to } 500°C.) \end{cases}$
Softening point ($10^{7.65}$ poises) ___ 1303° F. (706.2° C.)
Annealing point ($10^{13.4}$ poises) ___ 975° F. (523.7° C.)
Strain point ($10^{14.6}$ poises) ___ 915° F. (490.5° C.)
Annealing range ($10^{12.9}$ to $10^{15.2}$ poises) ___ 995° F. to 885° F. (535.0° C. to 473.8° C.)
Visible light transmission ___ 63% to 69% (average between 440 and 660 millimicrons)
Color ___ Neutral grey

TRANSMITTANCE AND TRICHROMATIC COEFFICIENTS

|  | Illuminant "C" | 7000 K.° Phosphor |
|---|---|---|
| Luminous transmittance | 65.7 | 65.8 |
| X | .3080 | .3040 |
| Y | .3176 | .3185 |
| Dominant wavelength ___ mmu | 498 | 502 |
| Exitation purity ___ per cent | 0.7 | 0.7 |
| Trichromatic coefficients of illuminants: |  |  |
| X | .3101 | .3059 |
| Y | .3163 | .3167 |

Sheet glass manufactured according to the invention was readily sealed by known methods to conical metal shells of 430 alloys.

The purview of the invention is not limited to the precise relative amounts of certain of the batch ingredients nor, as a necessary corollary, to the precise ultimate analysis of the residual components originating with these batch ingredients. The iron, cobalt and nickel oxides incorporated in the batch and present in the ultimate glass composition are for the purpose of imparting a neutral tint to the glass, thus achieving the stated objectives. Slight variations in the total concentration and/or the relative proportions of these three oxides from those above stated may be practiced to increase or decrease the degree of light absorption or slightly vary the trichromatic coefficients without departing from the purview of the invention, so long as such variation does not impair the other physical properties necessary to the successful practice of the invention.

What we claim is:

1. A glass to metal seal between an alloy consisting essentially of 83 percent by weight of iron and 17 percent by weight of chromium and a glass having an ultimate analytical composition of:

| Component | Parts by weight |
|---|---|
| $SiO_2$ | 69.23 |
| $Na_2O$ | 16.68 |
| $CaO$ | 7.44 |
| $MgO$ | 2.67 |
| $Al_2O_3$ | 3.04 |
| $NaCl$ | .14 |
| $Na_2SO_4$ | .63 |
| $As_2O_5$ | .05 |
| $Fe_2O_3$ | .10 |
| $CoO$ | .003 |
| $NiO$ | .018 |

2. In the process of preparing a glass by charging a glass batch to a melting tank, fusing the batch and continuously sheeting glass from resulting melt, the improvement which comprises charging to the melting tank a glass batch of the following composition:

| Component | Parts by weight |
|---|---|
| Sand | 1000 |
| Soda ash | 407.1 |
| Limestone | 86.3 |
| Dolomite | 198.9 |
| Aplite | 197.7 |
| Salt cake | 50.0 |
| Arsenic oxide ($As_2O_3$) | 3.0 |
| Rouge ($Fe_2O_3$) | 0.1 |
| Carbon | 1.0 |
| Cobalt oxide | 0.04 |
| Nickel oxide | 0.30 |

3. Drawn sheet glass having an ultimate analytical composition:

| Component | Parts by weight |
|---|---|
| $SiO_2$ | 69.23 |
| $Na_2O$ | 16.68 |
| $CaO$ | 7.44 |
| $MgO$ | 2.67 |
| $Al_2O_3$ | 3.04 |
| $NaCl$ | .14 |
| $Na_2SO_4$ | .63 |
| $As_2O_5$ | .05 |
| $Fe_2O_3$ | .10 |
| $CoO$ | .003 |
| $NiO$ | 0.18 |

JAMES EARLE DUNCAN.
JOHN J. SMITH.

No references cited.